United States Patent [19]

O'Keefe et al.

[11] 3,743,852

[45] July 3, 1973

[54] LOW-IMPEDANCE, HIGH-VOLTAGE DISCHARGE CIRCUIT

[75] Inventors: Bernard J. O'Keefe; Herbert E. Grier, both of Boston, Mass.

[73] Assignee: EG&G, Inc., Bedford, Mass.

[22] Filed: June 18, 1953

[21] Appl. No.: 362,516

[52] U.S. Cl. .................. 307/109, 307/108, 313/197

[51] Int. Cl. .......................................... H02m 3/06

[58] Field of Search ........................... 307/108, 109; 250/37, 36, 71; 313/197, 198, 189; 315/227, 241-245; 256/27 C, 27 E; 320/1

[56] References Cited

UNITED STATES PATENTS

| | | | |
|---|---|---|---|
| 2,417,452 | 3/1947 | Stiefel | 307/108 |
| 2,418,128 | 4/1947 | Labin | 307/108 |
| 2,422,086 | 6/1947 | Evans | 307/108 |
| 2,449,077 | 9/1948 | Lindenbald | 307/108 |
| 2,622,201 | 12/1952 | Toulon | 307/108 X |
| 2,331,398 | 10/1943 | Ingram | 313/197 X |
| 2,373,175 | 4/1945 | Depp | 313/197 X |
| 2,703,374 | 3/1955 | Fruengel | 313/197 X |
| 2,736,840 | 2/1956 | Tosswill | 315/241 X |

*Primary Examiner*—Benjamin A. Borchelt
*Assistant Examiner*—Nelson Moskowitz
*Attorney*—Leo M. Kelly

[57] ABSTRACT

A low-impedance, high-voltage discharge circuit is disclosed having a plurality of capacitors connected in parralel by plate conductors, a power supply for charging the capacitors and a circuit consisting of a discharge gap connected in series with a single load or with a plurality of loads connected in parralel by parallel plate conductors, the circuit being connected in parralel with the plurality of capacitors. Each connecting lead is made as short as possible and its inductance is negligible compared to the inductance of the plate conductors. A trigger circuit renders the discharge gap conductive.

15 Claims, 3 Drawing Figures

Figures 1, 2, 3:
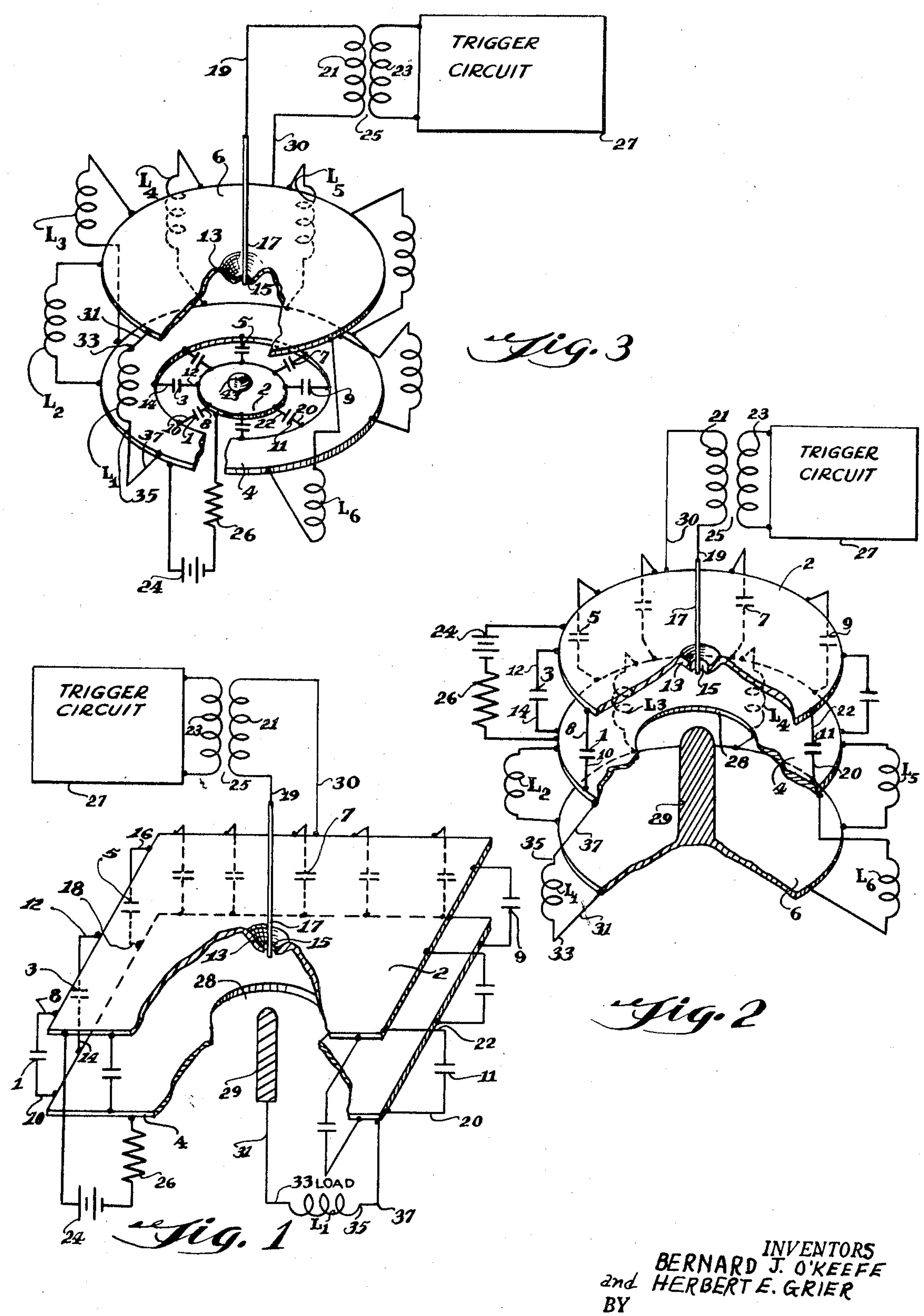

INVENTORS
BERNARD J. O'KEEFE
and HERBERT E. GRIER
BY
Rines and Rines
ATTORNEYS

LOW-IMPEDANCE, HIGH-VOLTAGE DISCHARGE CIRCUIT

The present invention relates to low-impedance, high-voltage discharge circuits.

In high-voltage discharge circuits of the type in which an energy storage device is permitted to discharge through a load in order to deliver an energy impulse to the load, it is frequently a requirement that the load be inductive in nature and that the inductance of the load be substantially the sole effective inductance of the discharge circuit. Such a criterion is desirable, for example, where the magnetic field of the load is to be utilized, as in operating a magneto-optical light valve. There are also other types of systems in which such low-impedance high-voltage discharge circuits are useful, and in some cases, it is desirable simultaneously to energize momentarily a plurality of inductive loads by producing discharges through the loads.

An object of the present invention is to provide a new and improved low-impedance high-voltage discharge circuit of this character.

A further object is to provide such a discharge circuit in which the inductance of the load is substantially the sole effective inductance in the discharge circuit. This is achieved through the use of large parallel-plate, non-inductive conductors as the principal conducting paths of the discharge circuit.

Still an additional object is to provide a new and improved discharge circuit adapted to permit the substantially simultaneous momentary energization of a plurality of loads.

Other and further objects will be explained hereinafter, and will be more particularly pointed out in the appended claims.

The invention will now be described in connection with the accompanying drawings, FIG. 1 of which is a schematic perspective view, in simplified form, of circuits and apparatus arranged and constructed in accordance with a preferred embodiment of the invention, with parts shown partly broken away to illustrate details; and FIGS. 2 and 3 are similar views of modifications.

A pair of substantially parallel, rectangular plate-conductors 2 and 4 are shown provided with a plurality of energy-storage devices, such as capacitors 1, 3, 5...7... 9...11...etc., connected at successively disposed points along the peripheral edges of the plate conductors 2 and 4. The capacitors may be charged from any desired voltage source, schematically illustrated as a battery 24, through a charging impedance 26. The leads or electric paths connecting the capacitors 1, 3, 5...7...9...11...etc. are kept of negligible length compared with the inductance of the load $L_1$ that is to be momentarily energized by the discharge of energy from the capacitors. Thus the lead conductors or electric paths 8 and 10, respectively connecting the upper and lower terminals of the capacitor 1 to the plate conductors 2 and 4, are shown very short compared to the dimensions of the plate conductors. Similarly, the lead conductors 12 and 14 connected to the opposite terminals of the capacitor 3, the lead conductors 16 and 18 connected to the opposite terminals of the capacitor 5, the lead conductors 22 and 20 connected to the opposite terminals of the capacitor 11, and so on, are very short in order that they may present inductance negligible as compared with the inductance of the load $L_1$. In view of the parallel connection of all of the capacitors 1, 3, 5... 7...9...11...etc. with respect to one another between the adjacent edges of the plate conductors 2 and 4, moreover, any inductive effect in the lead conductors or in the terminal bushings, not shown, employed in practical capacitors, may be minimized. If desired, the connections 8, 10, 12, 14, 16, 18, 20, 22, etc. may be made physically very small by soldering the casings, not shown, utilized to house practical capacitors, directly to one of the plate conductors, and by utilizing very short leads for the other electric-path connections.

Upon its inner surface, the plate conductor 2 carries a principal gap-discharge electrode 13, preferably provided with an aperture 15 within which a trigger electrode 17 may be disposed. The gap-discharge electrode 13 is preferably, though not essentially, disposed near the center of the plate conductor 2. An opening 28 is provided in the other plate conductor 4 to receive a further principal gap-discharge electrode 29 that shall be disposed in opposition to the gap-discharge electrode 13. The further gap-discharge electrode 29 may be connected by a short electric path 31 to one terminal, shown as the left-hand terminal 33, of the load $L_1$. The other terminal 35 of the load $L_1$ may similarly be connected by a very short electric path 37 to the plate conductor 4, preferably near its peripheral edge.

The energy stored in the capacitors 1, 3, 5... 7...9...11...etc. is caused to discharge rapidly through the load $L_1$, thereby to energize the load in response to the application between the trigger electrode 17 and the plate conductor 2 of a trigger voltage impulse. This impulse may be produced in any desired conventional trigger circuit 27. Suitable circuits for providing single or repetitive trigger impulses are described, for example, in U.S. Pat. No. 2,478,901, issued Aug. 16, 1949 to Harold E. Edgerton. The impulse may be fed from the primary winding 23 of a trigger transformer 25 to a step-up secondary winding 21 thereof. The secondary winding 21 may be connected on one side by a conductor 19 to the trigger electrode 17, and, on the other side, by a conductor 30 to the plate conductor 2 and hence to the gap-discharge electrode 13. The break-down of the air or other medium between the trigger electrode 17 and the gap-discharge electrode 13 in response to this trigger impulse causes a break-down or arc between the principal gap-diacharge electrodes 13 and 29. The capacitors 1, 3, 5...7...9...11...etc. thereupon discharge their stored energy in a circuit traceable from the top electrodes of each capcitor along the flat-plate conductor 2 to the gap-discharge electrode 13, through the arc between the gap-discharge electrodes 13 and 29, along the short electric path 31 to the load $L_1$, through the load $L_1$ and the short electric path 37 to the flat-plate conductor 4, and along the plate conductor 4 back to the lower terminals of the capacitors. There is thus produced a rapid discharge through the load $L_1$ of the energy stored in the capacitors. The magnitude of the voltage discharge in this manner depends upon the voltage value of the source 24, and this may be of very high value.

The principal electrical length of the discharge circuit is along the large plate conductors 2 and 4. These conductors are substantially non-inductive since they do not enclose appreciable magnetic looping area as a result of their parallel, flat construction. Since, as before stated, the electric paths connecting the capacitors to the flat-plate conductors 2 and 4 and the electric paths connecting the load $L_1$ to the gap-discharge electrode 29 and to the plate conductor 4 are purposely made of very short length to present inductance negligible compared with the inductance of the load $L_1$, this inductance of the load $L_1$ will therefore determine substantially the entire inductive reactance of the discharge circuit. The parallel connections of the capacitors, furthermore, as previously discussed, serve further to render negligible any inherent inductance in the capacitor structures themselves.

Since the half-cycle time T of discharge of the capacitors into the load $L_1$ is determined approximately by the expression $T = \pi \sqrt{LC}$, where $L$ is the inductance of the load $L_1$ and $C$ is the capacitance of the capacitors, it is possible with this type of circuit to determine quite accurately the pulse width or time duration of the discharge impulse produced in the load $L_1$ merely by adjusting the value of the inductance of the load. A sure and definite control over the duration of the high-voltage discharge is thereby achieved. As an illustration, with a load $L_1$ comprising a coil having about six and one-half turns about an inch in diameter, with capacitors of resultant capacity C of about 4 microfarads, and with a voltage from a source 24 of about 8,000 volts, discharges of substantially 8,000-volts peak voltage and of pulse duration equal to approximately six microseconds may be produced. Such a system has particular application in the before-mentioned magneto-optical light-valve application.

While the plate conductors 2 and 4 have been shown rather widely spaced apart in all of the figures of the drawings, this is only for purposes of illustrating the details of the invention. In actual practice, on the contrary, the plate conductors may be disposed very close together. If desired, furthermore, the plate conductors 2 and 4 may be separated from one another by a thin insulation plate, not shown, provided with an aperture in the path between the gap-discharge elctrodes 13 and 29 to permit the breakdown of the air or other medium therebetween. More or less capacitors than the number shown, may, of course, be utilized.

The present invention lends itself, also, to the energization of a plurality of loads. Two different structures for achieving such operation are illustrated in FIGS. 2 and 3. In FIG. 2, the plate conductors 2 and 4 are shown of circular contour, centrally alined and of substantially the same diameter. This is quite useful for the multi-load energization arrangement, though rectangular or other configurations may equally well be utilized in all of the embodiments of the invention. The gap-discharge electrode 29 is shown centrally supported upon a further plate conductor 6 disposed substantially parallel to the plate conductors 2 and 4. The load $L_1$ is connected by the very short conductors 31 and 37 between the peripheral edges of the plat conductors 6 and 4, respectively. A plurality of similar loads, $L_2$, $L_3$, $L_4$, $L_5$, $L_6$, and so on, are also shown connected in parallel between successively disposed corresponding points, preferably along the peripheral edges, of the plate conductors 4 and 6. These connections may be effected at other points than at the edges of the plate conductors, though connections at the edges assist in maintaining the length of the connecting paths very short and thus of inductance negligible compared with the inductance of the loads. More or less loads than the number shown in the drawings may be utilized. The operation of the trigger circuit 27 will cause the capacitors 1, 3, 5...7...9...11...etc. to discharge in the discharge circuit traceable from the upper terminals of the capacitors along the plate conductor 2 to the gap-discharge electrode 13, across the gap between the gap-discharge electrodes 13 and 29 to the plate conductor 6, along the plate conductor 6 to the lower terminals of the loads $L_1$, $L_2$, $L_3$, $L_4$, $L_5$, $L_6$, etc., through the respective loads to the plate conductor 4 and thence to the lower terminals of the capacitors.

In the modification of FIG. 3, the plate conductor 2 comprises a substantially circular plate conductor and the plate conductor 4, a co-planar annular plate conductor concentric with the plate conductor 2. The capacitors 1, 3, 5... 7...9...11...etc. are shown connected between the outer edge of the circular plate conductor 2, and the inner edge of the annular plate conductor 4. The plate conductor 2, moreover, is shown provided with a solid gap-discharge electrode 43. The plate conductor 6 is disposed substantially parallel with the co-planar plate conductors 2 and 4 and is provided with the apertured gap-discharge electrode 13 within the aperture 15 of which the trigger electrode 17 may be disposed. The loads $L_1$, $L_2$, $L_3$, $L_4$, $L_5$, $L_6$, etc. are shown connected between successive points along the peripheral edge of the plate conductor 6 and corresponding points along the outer edge of the annular plate conductor 4. In this arrangement, the diameter of the plate conductor 6 and the outer diameter of the annular plate conductor 4 are preferably substantially the same and the connections are preferably effected near the before-mentioned peripheral edges thereof in order to maintain the path lengths of the connections very short. The operation of the system of FIG. 3 takes place in precisely the same manner as before described, the capacitors discharging through the plate conductors between the gap-discharge electrodes 13 and 43 and through the loads $L_1$, $L_2$, $L_3$, $L_4$, $L_5$, $L_6$, etc., simultaneously momentarily to energize the loads.

While in all of the embodiments of the invention, the trigger electrode 17 is shown disposed in an aperture of the gap-discharge electrode 13, this is not essential. In FIG. 3, for example, a trigger electrode could have been inserted within an aperture in the gap-discharge electrode 43 supported by the plate 2. In the circuits of FIGS. 1 and 2, also, the trigger electrode could have been utilized in connection with the electrode 29. It is not necessary, furthermore, though it is deemed most convenient, to insert the trigger electrode within an aperture in one of the gap-discharge electrodes. The trigger electrode may, as an example, merely be inserted within the space between the plate conductors.

Further modifications will appear to those skilled in the art, and all such are considered to fall within the spirit and scope of the present invention.

What is claimed is:

1. A low-impedance discharge circuit having, in combination, load means, a pair of separated plate conductors one of which is provided with a gap-discharge electrode and the other of which is connected to one terminal of the load means by an electric path of inductance negligible compared to the inductance of the load means, a further gap-discharge electrode disposed in opposition to the first-named gap-discharge electrode and connected to the other terminal of the load means, energy-storage means the opposite terminals of which are connected by electric paths of inductance negligible compared to the inductance of the load between the pair of plate conductors, and means for producing a discharge between the gap-discharge electrodes in order to establish a circuit for the flow of energy from the energy-storage means along the plate conductors and through the gap-discharge electrodes to the load means.

2. A low-impedance discharge circuit having, in combination, load means, a pair of separated plate conductors one of which is provided with a gap-discharge electrode and the other of which is connected near an edge thereof to one terminal of the load means by an electric path of inductance negligible compared to the inductance of the load means, a further gap-discharge electrode disposed in opposition to the first-named gap-discharge electrode and connected to the other terminal of the load means, energy-storage means the opposite terminals of which are connected by electric paths of inductance negligible compared to the inductance of the load means between adjacent edges of the pair of plate conductors, and means for producing a discharge between the gap-discharge electrodes in order to establish a circuit for the flow of energy from the energy-storage means along the plate conductors and through the gap-discharge electrodes to the load means.

3. A low-impedance discharge circuit having, in combination, load means, a pair of separated plate conductors one of which is provided with a gap-discharge electrode and the other of which is connected near an edge thereof to one terminal of the load means by an electric path of inductance negligible compared to the inductance of the load means, a further gap-discharge electrode disposed in opposition to the first-named gap-discharge electrode and connected to the other terminal of the load means, a plurality of capacitors each adapted to store energy from a source of voltage and the opposite terminals of which are connected by electric paths of inductance negligible compared to the inductance of the load means in parallel with the terminals of the other capacitors between successively disposed points along adjacent edges of the pair of plate conductors, and means for producing a discharge between the gap-discharge electrodes in order to establish a circuit for the flow of energy from the capacitors along the plate conductors and through the gap-discharge electrodes to the load means.

4. A low-impedance discharge circuit having, in combination, a load, a pair of separated substantially parallel plate conductors upon an inner surface of one of which is provided an intermediately disposed gap-discharge electrode, the other plate conductor being connected to one terminal of the load by an electric path of inductance negligible compared to the inductance of the load, a further gap-discharge electrode disposed between the plate conductors in opposition to the first-named gap-discharge electrode and connected to the other terminal of the load, energy-storage means the opposite terminals of which are connected by electric paths of inductance negligible compared to the inductance of the load between the pair of plate conductors, and means for producing a discharge between the gap-discharge electrodes in order to establish a circuit for the flow of energy from the energy-storage means along the plate conductors and through the gap-discharge electrodes to the load.

5. A low-impedance discharge circuit having, in combination, a load, a pair of separated substantially parallel plate conductors upon an inner surface of one of which is provided an intermediately disposed gap-discharge electrode, the other plate conductor being provided with an opening disposed opposite the gap-discharge electrode and connected to one terminal of the load by an electric path of inductance negligible compared to the inductance of the load, a further gap-discharge electrode disposed within the said opening in opposition to the first-named gap-discharge electrode and connected to the other terminal of the load, energy-storage means the opposite terminals of which are connected by electric paths of inductance negligible compared to the inductance of the load between the pair of plate conductors, and means for producing a discharge between the gap-discharge electrodes in order to establish a circuit for the flow of energy from the energy-storage means along the plate conductors and through the gap-discharge electrodes to the load.

6. A low-impedance discharge circuit having, in combination, a load, a pair of separated substantially parallel rectangular plate conductors upon an inner surface of one of which is provided an intermediately disposed gap-discharge electrode, the other plate conductor being provided with an opening disposed opposite the gap-discharge electrode and connected to one terminal of the load by an electric path of inductance negligible compared to the inductance of the load, a further gap-discharge electrode disposed within the said opening in opposition to the first-named gap-discharge electrode and connected to the other terminal of the load, energy-storage means the opposite terminals of which are connected by electric paths of inductance negligible compared to the inductance of the load between the pair of plate conductors, and means for producing a discharge between the gap-discharge electrodes in order to establish a circuit for the flow of energy from the energy-storage means along the plate conductors and through the gap-discharge electrodes to the load.

7. A low-impedance discharge circuit having, in combination, a load, a pair of separated substantially parallel circular plate conductors upon an inner surface of one of which is provided an intermediately disposed gap-discharge electrode, the other plate conductor being provided with an opening disposed opposite the gap-discharge electrode and connected to one terminal of the load by an electric path of inductance negligible compared to the inductance of the load, a further gap-discharge electrode disposed within the said opening in opposition to the first-named gap-discharge electrode and connected to the other terminal of the load, energy-storage means the opposite terminals of which are connected by electric paths of inductance negligible compared to the inductance of the load between the pair of plate conductors, and means for producing a discharge between the gap-discharge electrodes in order to establish a circuit for the flow of energy from the energy-storage means along the plate conductors and through the gap-discharge electrodes to the load.

8. A low-impedance discharge circuit having, in combination, a load, a pair of separated substantially parallel plate conductors upon an inner surface of one of which is provided an apertured gap-discharge electrode, the other plate conductor being provided with an opening disposed opposite the gap-discharge electrode and connected to one terminal of the load by an electric path of inductance negligible compared to the inductance of the load, a further gap-discharge electrode disposed within the opening in opposition to the first-named gap-discharge electrode and connected to the other terminal of the load, a plurality of capacitors each adapted to store energy from a source of voltage and the opposite terminals of which are connected by electric paths of inductance negligible compared to the inductance of the load in parallel with the terminals of the other capacitors between successively disposed points along adjacent edges of the pair of plate conductors, and means comprising a trigger electrode disposed within the said aperture of the first-named gap-discharge electrode for producing a discharge between the gap-discharge electrodes in order to establish a circuit for the flow of energy from the capacitors along the plate conductors and through the gap-discharge electrodes to the load.

9. A low-impedance discharge circuit having, in combination, a plurality of loads, a pair of separated plate conductors one of which is provided with a gap-discharge electrode, a plurality of electric paths of inductance negligible compared to the inductance of the loads, one path connecting a terminal of each load of the plurality of loads to the other plate conductor, a further plate conductor provided with a further gap-discharge electrode disposed in opposition to the first-named gap-discharge electrode and connected to the other terminals of the loads, energy-storage means the opposite terminals of which are connected by electric paths of inductance negligible compared to the inductance of the loads between the said pair of plate conductors, and means for producing a discharge between the gap-discharge electrodes in order to establish a circuit for the flow of energy from the energy-storage means along the plate conductors and through the gap-discharge electrodes to the loads.

10. A low-impedance discharge circuit having, in combination, a plurality of loads, a pair of separated plate conductors one of which is provided with a gap-discharge electrode, a plurality of electric paths of inductance negligible compared to the inductance of the loads and connecting one set of terminals of the plurality of loads to successively disposed points near an edge of the other plate conductor, a further plate conductor provided with a further gap-discharge electrode disposed in opposition to the first-named gap-discharge electrode and connected at successively disposed points near an edge thereof to the other set of terminals of the loads, a plurality of capacitors each adapted to store energy from a source of voltage the opposite terminals of which are connected by electric paths of inductance negligible compared to the inductance of the loads in parallel with the terminals of the other capacitors between successively disposed points along adjacent edges of the said pair of plate conductors, and means for producing a discharge between the gap-discharge electrodes in order to establish a circuit for the flow of energy from the capacitors along the plate conductors and through the gap-discharge electrodes to the loads.

11. A low-impedance discharge circuit having, in combination, a plurality of loads, a pair of separated substantially parallel plate conductors upon an inner surface of one of which is provided a gap-discharge electrode, the other plate conductor being provided with an opening disposed opposite the gap-discharge electrode, a plurality of electric paths of inductance negligible compared to the inductance of the loads and connecting one set of terminals of the plurality of loads to successively disposed points near an edge of the other plate conductor, a further plate conductor separated from and substantially parallel to the said other plate conductor and provided with a gap-discharge electrode extending within the said opening in opposition to the first-named gap-discharge electrode and connected to the other set of terminals of the loads, a plurality of capacitors adapted to store energy from a source of voltage and the opposite terminals of which are connected by electric paths of inductance negligible compared to the inductance of the loads in parallel with one another between successively disposed points along adjacent edges of the said pair of plate conductors, and means for producing a discharge between the gap-discharge electrodes in order to establish a circuit for the flow of energy from the capacitors along the plate conductors and through the gap-discharge electrodes to the loads.

12. A low-impedance discharge circuit having, in combination, a plurality of loads, a pair of separated substantially parallel plate conductors upon an inner surface of one of which is provided an apertured gap-discharge electrode, the other plate conductor being provided with an opening disposed opposite the gap-discharge electrode, a plurality of electric paths of inductance negligible compared to the inductance of the loads and connecting one set of terminals of the plurality of loads to successively disposed points near an edge of the other plate conductor, a further plate conductor separated from and substantially parallel to the said other plate conductor and provided with a gap-discharge electrode extending within the said opening in opposition to the first-named gap-discharge electrode and connected to the other set of terminals of the loads, a plurality of capacitors adapted to store energy from a source of voltage and the opposite terminals of which are connected by electric paths of inductance negligible compared to the inductance of the loads in parallel with one another between successively disposed points along adjacent edges of the said pair of plate conductors, and means comprising a trigger electrode disposed within the said aperture of the first-named gap-discharge electrode for producing a discharge between the gap-discharge electrodes in order to establish a circuit for the flow of energy from the capacitors along the plate conductors and through the gap-discharge electrodes to the loads.

13. A low-impedance discharge circuit having, in combination, a plurality of loads, a pair of separated substantially parallel centrally alined substantially circular plate conductors upon an inner surface of one of which at its center is provided an apertured gap-discharge electrode, the other plate conductor being provided with a central opening disposed opposite the gap-discharge electrode, a plurality of electric paths of inductance negligible compared to the inductance of the loads and connecting one set of terminals of the plurality of loads to successively disposed points near an edge of the other plate conductor, a further substantially circular plate conductor separated from and substantially parallel to the said other plate conductor and provided centrally with a gap-discharge electrode extending within the said opening in opposition to the first-named gap-discharge electrode and connected to the other set of terminals of the loads, a plurality of capacitors adapted to store energy from a source of voltage and the opposite terminals of which are connected by electric paths of inductance negligible compared to the inductance of the loads in parallel with one another between successively disposed points along adjacent edges of the said pair of plate conductors, and means comprising a trigger electrode disposed within the said aperture of the first-named gap-discharge electrode for producing a discharge between the gap-discharge electrodes in order to establish a circuit for the flow of energy from the capacitors along the plate conductors and through the gap-discharge electrodes to the loads.

14. A low-impedance discharge circuit having, in combination, a plurality of loads, a pair of separated substantially co-planar plate conductors upon an inner surface of one of which is provided a gap-discharge electrode, a plurality of electric paths of inductance negligible compared to the inductance of the loads and connecting one set of terminals of the plurality of loads to successively disposed points near an edge of the other plate conductor, a further plate conductor separated from and substantially parallel to the pair of plate conductors provided with a further gap-discharge electrode disposed in opposition to the first-named gap-discharge electrodes and connected to the other set of terminals of the loads, a plurality of capacitors adapted to store energy from a source of voltage and the opposite terminals of which are connected by electric paths of inductance negligible compared to the inductance of the loads in parallel with one another between successively disposed points along adjacent edges of the said pair of plate conductors, and means for producing a discharge between the gap-discharge electrodes in order to establish a circuit for the flow of energy from the capacitors along the plate conductors and through the gap-discharge electrodes to the loads.

15. A low-impedance discharge circuit having, in combination, a plurality of loads, a substantially circular plate conductor and a concentric annular plate conductor substantially co-planar therewith, the circular plate conductor being provided with a centrally disposed gap-discharge electrode, a plurality of electric paths of inductance negligible compared to the inductance of the loads and connecting one set of terminals of the plurality of loads to successively disposed points near the outer edge of the annular plate conductor, a further circular plate conductor separated from and substantially parallel to the first-named circular plate conductor provided with an aperture gap-discharge electrode disposed in opposition to the first-named gap-discharge electrode, the peripheral edges of the further plate conductor being connected to the other set of terminals of the loads, a plurality of capacitors adapted to store energy from a source of voltage and the opposite terminals of which are connected by electric paths of inductance negligible compared to the inductance of the loads in parallel with one another between the outer and inner edges of the first-named circular plate conductor and the annular plate conductor, respectively, and means comprising a trigger electrode disposed within the aperture of the further gap-discharge electrode for producing a discharge between the gap-discharge electrodes in order to establish a circuit for the flow of energy from the capacitors along the plate conductors and through the gap-discharge electrodes to the loads.

* * * * *